Figure 1:
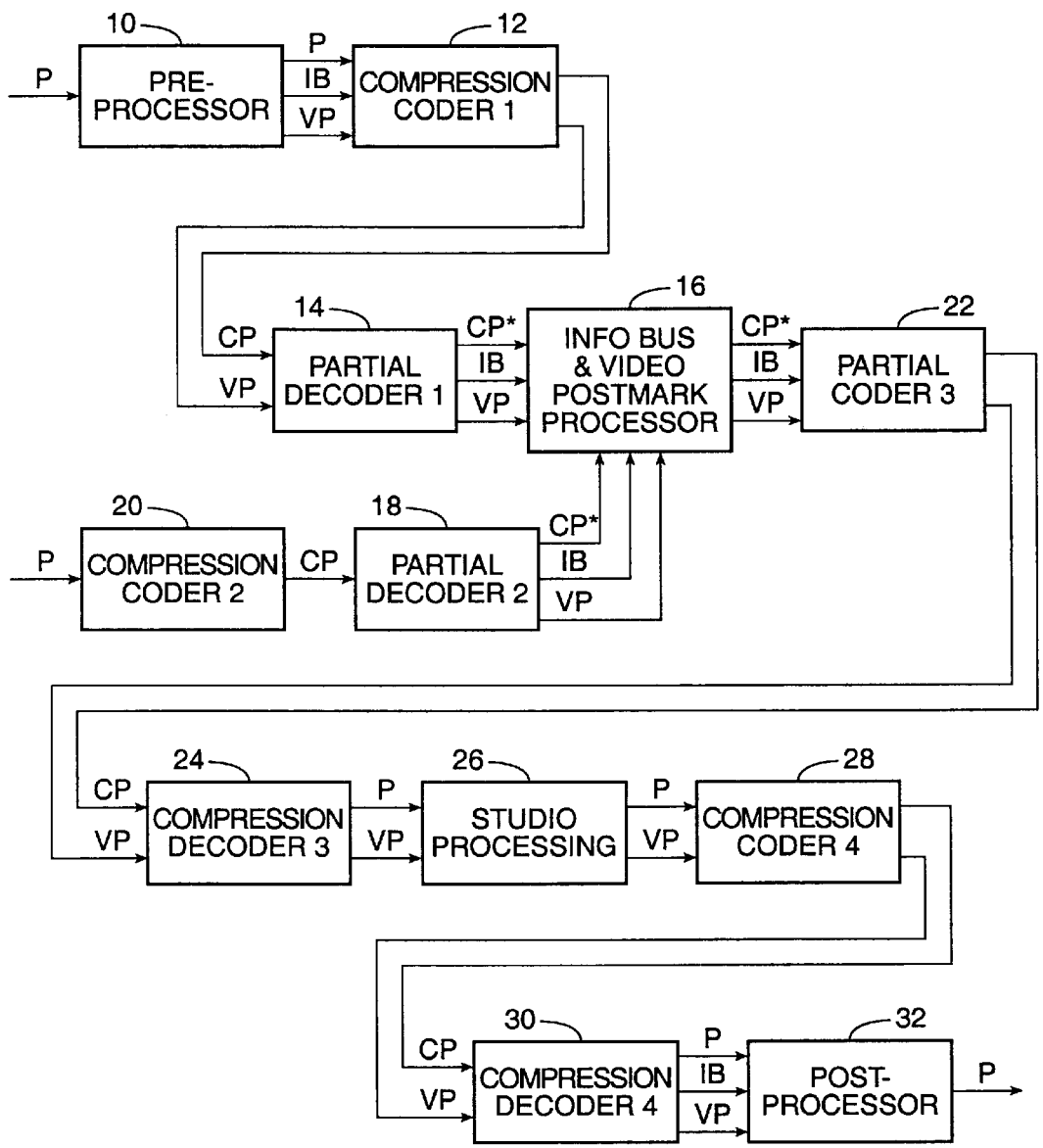

United States Patent [19]
Knee et al.

[11] Patent Number: 6,088,393
[45] Date of Patent: Jul. 11, 2000

[54] VIDEO SIGNAL PROCESSING

[75] Inventors: Michael James Knee, Petersfield; Bruce Fairbairn Devlin, Chiddingfold, both of United Kingdom

[73] Assignee: Snell & Wilcox Limited, United Kingdom

[21] Appl. No.: 08/901,846

[22] Filed: Jul. 28, 1997

[30] Foreign Application Priority Data

Jan. 30, 1995 [GB] United Kingdom ............... 9501736
Jan. 30, 1996 [WO] WIPO ............... PCT/GB96/00202

[51] Int. Cl.[7] ............................................. H04N 7/18
[52] U.S. Cl. ................... 375/240; 348/390; 348/405; 348/719; 348/720
[58] Field of Search ............................ 348/390, 384, 348/405, 407, 410, 413, 715, 719, 720; 382/233, 166; 395/162, 164; 375/240

[56] References Cited

U.S. PATENT DOCUMENTS

| | | | |
|---|---|---|---|
| 5,557,734 | 9/1996 | Wilson | 395/162 |
| 5,794,065 | 8/1998 | Hatakeyama et al. | 395/800.26 |
| 5,818,967 | 10/1998 | Bhattacharjee et al. | 382/233 |

*Primary Examiner*—Andy Rao
*Attorney, Agent, or Firm*—Townsend and Townsend and Crew LLP; Kenneth R. Allen

[57] ABSTRACT

In a signal transmission chain containing, for example MPEG2 coders (12, 20, 28) and decoders (24, 30), an information channel extends throughout the signal chain. Signal processing elements in the chain take advantage of information (VP) on the information channel and also add to it information (VP) concerning the process performed by that signal processing element. The information channel, towards the end of the signal transmission chain, therefore carries information (VP) relating to all or most of the various processes performed by in the chain.

5 Claims, 2 Drawing Sheets

VIDEO SIGNAL PROCESSING

This invention relates to video signal processing and more particularly to video processing as part of a complete signal transmission chain, which typically involves several video compression encoder and decoder pairs (codecs) in cascade, together with intervening processes such as switching or re-multiplexing of coded signals or enhancement processing of decoded video signals.

In a conventional chain, each process operates in isolation from other processes. This can lead to inefficiency and loss of performance; inefficiency, because each process is obliged to re-calculate all its parameters such as motion vectors, and loss of performance because because impairments introduced at an earlier point in the chain might unknowingly be re-coded as picture information.

The invention disclosed in the WO 95/35628, in at least one embodiment, overcomes the above problems to some extent by providing an information path between a compression decoder and a downstream encoder. This, together with the side information that is transmitted as part of a compressed bitstream within each particular codec, provides a measure of communication of important parameters through the whole chain. However, the capabilities of this communication path are restricted by the fact that the coded bitstream contains only one set of essential coding parameters, so that the past history of processes performed on the signal is eventually lost.

It is an object of this invention to overcome, or at least to reduce the deleterious effects of this problem.

Accordingly, the present invention consists, in one aspect, in a signal transmission chain comprising a plurality of signal processing elements which include a compression coder adapted to receive a signal and to generate therefrom a compressed or partially compressed coded signal and a compression decoder adapted to receive a compressed or partially compressed coded signal and to generate therefrom a decoded or partially decoded signal, wherein an information channel extends throughout the signal chain and wherein a substantial number of the signal processing elements are adapted to process information on the information channel by addition of information concerning the process performed by that signal processing element such that the information channel towards the end of the signal transmission chain carries information relating to the processes performed by a substantial number of the signal processing elements in the chain.

The present invention may therefore be regarded as overcoming the described, remaining problem by providing an "audit trail", a digital bitstream associated with the picture signal which contains information about its processing history and to which each significant process in the chain adds its own information. This bitstream—which will hereafter be termed the VP signal—can accompany, or even be part of, the information bus mentioned above. In the compressed domain, the bitstream would have to be sent as an accompanying user data signal.

Figure 2:
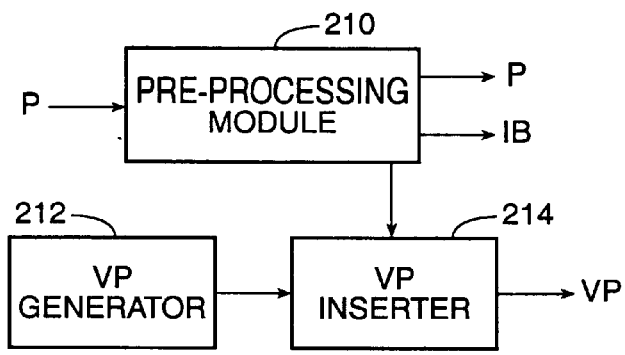
Figure 3:
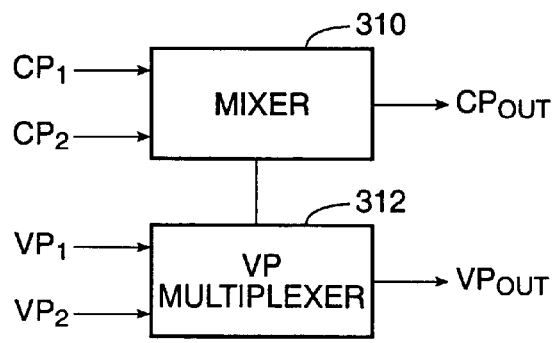
Figure 4:
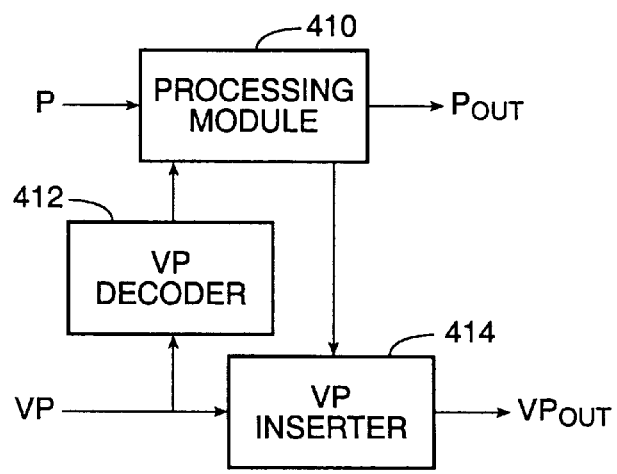

The present invention will now be described by way of example with reference to the accompanying drawings in which:

FIG. 1 is a block diagram illustrating a signal transmission chain according one embodiment of the invention, and FIGS. 2, 3 and 4 show in more detail the manner in which the VP signal is generated and processed in specific components in the signal transmission chain of FIG. 1.

The chain shown in FIG. 1 is described in detail in WO 95/35628, referred to above. Accordingly, the following description is restricted to the additional handling of the VP signal. The example is based on compression coders and decoders with some intervening processing. The notion of partially decoding MPEG2 signals to DCT coefficients is employed and, again, reference is directed to WO 95/35628 for more information.

A picture signal P forms the input to a pre-processor (10) which performs a function such as motion compensated noise reduction. The output of the pre-processor is a picture signal P, an information bus signal IB and a VP signal. Because there is, in this example, no VP signal input to the pre-processor, the VP module in the pre-processor (10) creates a new signal containing such information as the nature of the processing (noise reduction), the characteristics of any fixed filters used, the nature of the motion estimation algorithm used and the range and accuracy of motion vectors. Compression coder-1 (12) adds its own information to the VP signal, such as: nature of processing (MPEG-2 compression, for example), coding mode restrictions and bit rate. It then transmits the VP signal in a side data channel. Partial decoder-1 (14) receives the VP signal, adds its own information and sends the result to the information bus and VP signal processor (16). This processor combines the partially decoded bitstreams from partial decoder-1 (14) and from partial decoder-2 (18), making use of the two information bus and VP inputs to do so. In this example, partial decoder-2 (18) operates on the output of a compression coder-2 shown at (20). An example of how the VP information might be used in this processor is that the bit rate chosen for partial coder-3 (22) might be equal to the lowest bit rate recorded in either of the incoming VP signals, on the basis that a higher bit rate would be wasted. The action of the processor on the VP signals themselves is that the two are concatenated, with some suitable syntax identifying them as coming from different sources.

The chain continues with the remaining processes each adding their information to the VP signal and each using the information provided in the VP signal as appropriate. In this example, the signal passes through compression coder-3 (24); a generalised studio processing block (26); compression ccder-4 (28); compression decoder-4 (30) and a post processor-block (32).

There is set out below, by way of example, a high level textual representation of what might be contained within the VP bitstream, towards the end of a signal transmission chain.

```
{
    {
    Source CCIR 602 525/60;
    Process
        {
        Nature: Motion compensated noise reduction type XYZ;
        Motion estimation method: phase correlation;
        Motion range (±64, ±64);
        Motion accuracy (0.5, 0.5);
```

-continued

```
        Fixed diagonal filter type IJK;
    }
Process
    {
        Nature: MPEG-2 compression coding;
        Motion vector source: previous process;
        Bit rate: 3.5 Mbit/s;
        GOP structure: fixed IBBPBBPBBI;
        Channel coding: type ABC for terrestrial transmission;
    }
Process
    {
        Nature: Partial MPEG-2 compression decoding to DCT
coefficients;
    }
}
Process
    {
        Nature: MPEG-2 compression coding;
        Motion vector source: internal block matching;
        Motion vector range: (±16, ±8);
        Motion vector accuracy: (1, 1);
        Bit rate: 2.5 Mbit/s;
        GOP structure: fixed IPPPPI;
    }
Process
    {
        Nature: Partial MPEG-2 compression decoding to DCT
        coefficients;
    }
}
Process
{
    Nature: Bitstream switcher using Information Bus and VP signal;
}
Process
{
    Nature: Partial MPEG-2 compression coding from DCT coefficients;
    Motion vector source: previous process;
    Bit rate: 2.5 Mbit/s;
}
Process
{
    Nature: MPEG-2 compression decoding;
    Concealment strategy: non-motion-compensated;
    Concealment rate: 3 slices per second;
}
Process
{
    Nature: Motion compensated standards conversion 525/60 to 625/50;
    Motion vector source: previous process;
    Motion vector processing: MPEG-macroblock-based to pixel-based;
}
Process
{
    Nature: MPEG-2 compression coding;
    Motion vector source: previous process;
    Motion vector processing: pixel-based to MPEG macroblock-based;
    Bit rate: 4.0 Mbit/s;
    Channel coding: type PQR for satellite transmission;
}
Process
{
    Nature: MPEG-2 compression decoding;
    Concealment strategy: motion compensated from previous stripe;
    Concealment rate: 45 macroblocks per second;
}
}
```

Brief examples will now be given of apparatus which may be used in a signal chain according to the present invention.

A VP generator generates the basic "skeleton" bitstream of a VP signal, without any audit trail.

A VP inserter takes an input VP bitstream, identifies the end of the existing information and appends information about the current process. In the case of an MPEG-2 processor with information bus capability according to the mentioned copending application, the VP inserter might incorporate an information bus input.

A VP multiplexer creates a new VP bitstream from two input VP bitstreams, including syntax to identify the fact that two parallel streams have been combined, and appends information about the multiplexing operation itself.

A VP decoder reads a VP bitstream and decodes the information for further use.

Reference is now directed to FIG. 2, which shows in more detail the manner in which the VP signal is derived in the pre-processor (10).

The incoming picure signal P is taken to an appropriate pre-processing module (210) which outputs a pre-processed picture signal and, in this example, an information bus signal IB. A VP generator (212) generates the basic "skeleton" bitstream of a VP signal, and passes this to a VP inserter (214) which receives data from the pre-processing module (210) appropriate to descibe the nature of the pre-processing and appends this data to the VP signal.

Referring now to FIG. 3, the example is taken of mixing, such as that which might occur in processor (16) of FIG. 1. Two partially decoded picture signals $CP_1$ and $CP_2$ are taken to a mixer (310) which outputs a partially decoded picture signal $CP_{out}$. Corresponding signals $VP_1$, and $VP_2$ are taken to a VP multiplexer (312) which combines the two signals in a way determined by the switching conducted in block (310).

Turning now to FIG. 4, an example is given of how the VP signal may be used in, perhaps, the studio processing block (26). The incoming picture signal P is taken to a processing module (410). A VP decoder (412) receives the incoming VP signal and decodes it to provide information to assist processing in module (410). Data which characterises this processing is then provided to VP inserter (414) for appending to the VP signal.

It will be understood that this invention has been described by way of example only.

What is claimed is:

1. A signal transmission chain comprising:

a plurality of signal processing elements which include a compression coder adapted to receive a signal and to generate thereform a compressed or partially compressed coded signal; and a compression decoder adapted to receive the compressed or partially compressed coded signal and to generate therefrom a decoded or partially decoded signal, wherein an information channel extends throughout the signal transmission chain and wherein a substantial number of the signal processing elements are adapted to process information on the information channel by addition of information concerning the process performed by that signal processing element such that the information channel towards the end of the signal transmission chain carries information relating to the processes performed by a substantial number of the signal processing elements in the signal transmission chain.

2. The signal transmission chain according to claim 1, wherein a substantial number of the signal processing elements are adapted to decode and utilize information on the information channel to assist the signal process performed by that signal processing element.

3. The signal transmission chain according to claim 1, in which the information channel is adapted to carry information denoting the nature of each said process and parameters characterizing the process.

4. For use in a signal transmission chain according to any one of the preceding claims, a signal processing element comprising generater means for generating a skeleton signal on said information channel and inserter means for appending thereto information relating to the process performed by said signal processing element.

5. For use in the signal transmission chain according to claim 1, a signal processing element comprising decoder means for decoding information received on said information channel to assist the process performed by said signal processing element and inserter means for appending thereto information relating to the process performed by said signal processing element.

\* \* \* \* \*